(12) United States Patent
Hsu (10) Patent No.: US 8,244,284 B2
(45) Date of Patent: Aug. 14, 2012

(54) MOBILE COMMUNICATION DEVICE AND THE OPERATING METHOD THEREOF

(75) Inventor: Kuo-Tai Hsu, Hsin-Tien (TW)

(73) Assignees: Giga-Byte Communications, Inc., Taipei County (TW); Giga-Byte Technology Co., Ltd., Taipei County (TW)

( * ) Notice: Subject to any disclaimer, the term of this patent is extended or adjusted under 35 U.S.C. 154(b) by 940 days.

(21) Appl. No.: 11/819,549

(22) Filed: Jun. 28, 2007

(65) Prior Publication Data

US 2009/0005088 A1 Jan. 1, 2009

(51) Int. Cl.
*H04W 4/00* (2009.01)

(52) U.S. Cl. ............... 455/466; 455/457; 455/556.1; 455/556.2; 455/566; 345/156

(58) Field of Classification Search ........... 455/566, 455/457, 556.1, 556.2; 345/156
See application file for complete search history.

(56) References Cited

U.S. PATENT DOCUMENTS

| 6,999,987 | B1 * | 2/2006 | Billingsley et al. | ......... 709/203 |
| 2005/0093845 | A1 * | 5/2005 | Brooks et al. | ............. 345/179 |
| 2006/0013487 | A1 * | 1/2006 | Longe et al. | ............... 382/229 |
| 2008/0141178 | A1 * | 6/2008 | Roscoe | .................... 715/854 |

FOREIGN PATENT DOCUMENTS

| JP | 2-264546 | 10/1990 |
| JP | 4-42316 | 2/1992 |
| JP | 6-202794 | 7/1994 |
| JP | 10-210128 | 8/1998 |
| JP | 2001-111708 | 4/2001 |
| JP | 2002-290506 | 10/2002 |
| JP | 2002532794 | 10/2002 |

* cited by examiner

*Primary Examiner* — Kamran Afshar
*Assistant Examiner* — Edward Zhang
(74) *Attorney, Agent, or Firm* — Chun-Ming Shih (57) ABSTRACT

A device and its operating method for mobile communication, the mobile communication device includes a micro processor, a memory which has an instruction database and an image database, a touch panel, a message module and a communication module. After a user inputs a symbol, the micro processor will retrieve and execute an operating instruction which corresponds to the symbol from the image database and the instruction database, or look for the contact and perform the communication action which corresponds to the symbol. When the operating instruction or the communication action which corresponds to the symbol fails, the micro processor will enter a setting interface to set up an operating instruction or communication action which corresponds to the symbol.

19 Claims, 9 Drawing Sheets

MOBILE COMMUNICATION DEVICE AND THE OPERATING METHOD THEREOF

BACKGROUND

1. Field of the Invention

The invention relates to a mobile communication device and an operating method thereof and more particularly to a mobile communication device and an operating method thereof which trigger the execution of software or communication by painting a symbol on the touch panel.

2. Related Art

Presently, a mobile phone can be embedded with a high operation micro processor to execute several kinds of multi-functional software. For example, in the past, since only low clock frequency is available to a mobile phone, only basic functions such as dialing or answering the phone, and sending out or receiving the messages can be executed. However, as the mobile operation technology develops, and when a mobile phone can be embedded with a higher clock frequency, more functions can be available, and will not only limit to the basic functions above, for example functions such as e-alarm clock, multimedia playing, camera, browsing pictures, internet, and even the satellite navigation are also can be executed. However, such mobile phone may have too many complex and difficult operating procedures because of too many functions included, so users may need spending more time to find the application software to execute the function. For instance, the current phone book of a mobile phone can support storage by category so users can set up a storage group based on the relations with the contacts. However, days later when a user is trying to use this function to find the contacts to be called on, he may waste a lot of time in trying to locate the contact because there is too many storage groups and may forget which group the contact belongs to.

Accordingly, hot keys are used to solve the problems of having a long and complex operating procedure. Hot key is an operating method that by pressing a certain number of buttons simultaneously or in a certain series to execute a specific function. Presently, hot keys are widely used in computers. For example, Ctrl+Alt+Del are hot keys for restart a computer system. Now, the hot key concept is also used in some mobile phones, for example, by pressing the Talk button and a specific number button, the mobile phone can be locked. Therefore the long and complex operation procedures can be simplified by applying this hot keys technique. However, not every kind of mobile phones can be applied hot keys technique. For instance, now, more and more mobile phones are using a personal digital assistant (PDA) structure, which has a virtual keyboard on the touch panel instead of a physical keyboard. Therefore, using one or several physical buttons to constitute hot keys in order to simplify the operation will become impractical in this kind of mobile phone structure. Besides, even hot keys are used in mobile phones in order to simplify the operation, in practical, unnecessary operating error may still happen, such as incidentally pressing the hot keys and calling some contacts, or erroneously pressing hot keys for triggering Bluetooth which as a result may speed up the consumption of the battery.

SUMMARY

According to the foregoing problems of having long and complex operating procedures, the purpose of the invention is to use handwriting to input a symbol, and then by determining what operating instruction is represented by the symbol to control the corresponding software, so the purpose of simplifying the operation can be achieved.

Another purpose of the invention is to use handwriting to input symbols to call someone in the contacts or to send messages to this person.

In order to achieve the forgoing purposes, the mobile communication device includes: a touch panel for handwriting to input the symbols and for being a operation interface; a memory, which includes an image database for storing the symbols, an instruction database for storing the operating instructions which correspond to the symbols, and at least one software; a micro processor, which analyzes the symbols based on the image database, retrieves the corresponding operating instruction from the instruction databases based on the analysis result, and executes the corresponding software based on the operating instruction, and when a analysis or a retrieve of the symbols or the operating instructions fails, establishes a corresponding operating instruction and software; a communication module, which connects to the micro processor to execute the voice communication; and a message module, which connects to the micro processor to send messages. In addition, the micro processor also can search for the corresponding contact in the instruction database based on the analysis result in instruction to make a call or send a message. Similarly, when the analysis of the corresponding contact and the communication action to be executed fails, the micro processor can further set up the corresponding contact and communication actions.

The operating method of the above mobile communication device, when used in executing an operating instruction which corresponds to the symbols or in executing software, can include the following steps. First, draw a symbol at the input screen of the touch panel. Then, determine the instruction code which corresponds to the symbol based on the image database. After that, retrieve the corresponding operating instruction from the instruction databases according to the instruction code. Finally, determine whether the symbol corresponds to the instruction code and the operating instruction, where if the answer is yes, execute the operating instruction, otherwise set up the operating instruction which corresponds to the symbol, or the software which corresponds to the operating instruction. Among them, the step of setting up the operating instruction which corresponds to the symbol, or the software which corresponds to the operating instruction may include the following steps: selecting executing setting up with the input symbol or reentering a symbol; clicking on the corresponding software on the software list; producing an operating instruction list based on the selected software; and selecting the operating instruction which corresponds to the symbol.

In addition, the operation method of the above mobile communication device, when used in making a call or sending a message to the contact which corresponds to the inputted symbol, can include the following steps. First, draw a symbol at the input screen of the touch panel. Then, determine the instruction code which corresponds to the symbol based on the image database. After that, search for the corresponding contact and communication action from the instruction databases according to the instruction code. Finally, determine whether the corresponding contact and communication action can be found, where if the answer is yes, execute the corresponding communication action, otherwise set up the contact and the communication action which correspond to the symbol. Among them, the step of setting up the contact and communication action which correspond to the symbol may include the following steps: opening up the contact list; selecting a contact from the contact list; choosing a selection of setting up symbol with the inputted symbol or reentering symbol; and choosing a selection of the communication actions for making a call or sending a message.

According to the description above, because the invention uses image database and instruction database to determine the action which corresponds to the inputted symbol, and directly executes the corresponding action, the long and complex operation procedures can be eliminated and therefore the mobile phone's operation can be simplified. Besides, since in this invention, the symbols is inputted at the input screen by handwriting, the disadvantages which would happen in the traditional physical hot keys mobile phone will not happen here.

BRIEF DESCRIPTION OF THE DRAWINGS

The present invention will become more fully understood from the detailed description given below, which is for illustration only and thus is not limitative of the present invention, wherein.

DETAILED DESCRIPTION

Figure 1A:
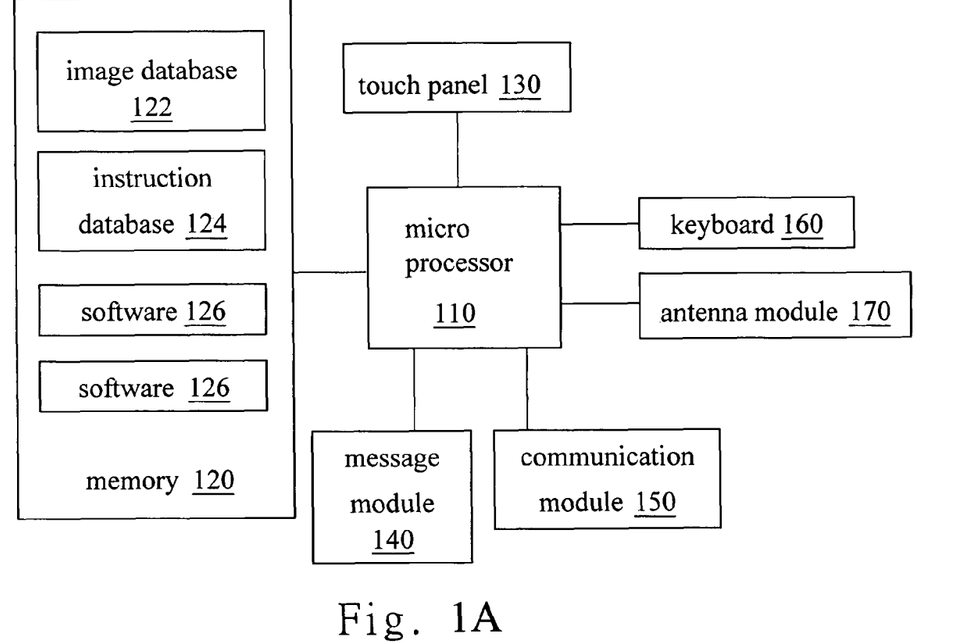
FIG. 1A is a diagram showing the structure of the mobile communication device according to the invention.

FIG. 1A is a diagram of a mobile communication device structure based on the invention. This preferred illustrative embodiment is suitable for a mobile communication device which uses handwriting to input at least one symbol to execute a predetermined operation instruction which corresponds to the symbol. The mobile communication device includes: a micro processor 110, a memory 120, a touch panel 130, a message module 140, a communication module 150, a keyboard 160, and an antenna module 170.

The touch panel 130 is used for handwriting to input a symbol and being an operating interface (user's interface) of the mobile communication device. The memory 120 can be a embedded memory or a external memory, where includes an image database 122, an instruction database 124, and at least one software 126, which are respectively used for storing the inputted symbols, the operating instructions which correspond to the symbols, and the software which provide additional functions to the mobile communication device such as a calculator, a currency calculation software, or a GPS navigation software. After a user handwrites to input a symbol, the micro processor 110 will analyze these symbols based on the image database 122, retrieve the corresponding operating instruction from the instruction database 124 according to analysis result, and then executes the corresponding software based on the operating instruction. If the micro processor 110 can not recognize the inputted symbol from the image database 122 and the instruction database 124, the mobile communication device will use, for example, the user's interface to allow the user to set up an operating instruction and software which correspond to the symbol. Except for the touch panel, the user also can operate the mobile communication device by using a keyboard to input the text, or make a call. The communication functions of the mobile communication device, such as making a call or sending a message, are achieved by the antenna module 170.

Figure 1B:
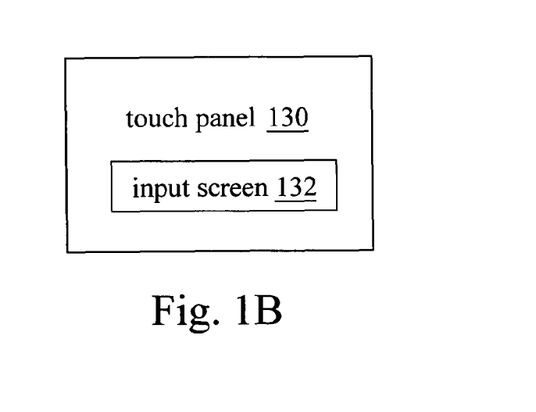
FIG. 1B is a diagram showing the touch panel in the FIG. 1A.
Figure 1C:
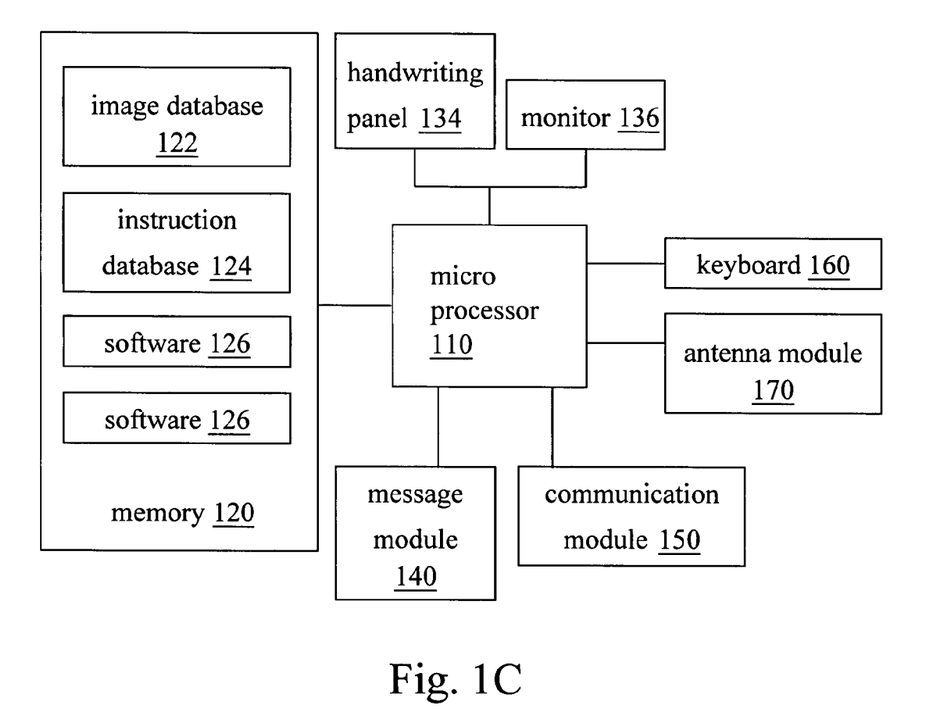
FIG. 1C is a diagram showing another structure of the mobile communication device according to the invention.

FIG. 1B is a diagram showing the touch panel of the FIG. 1A. In the figure, the touch panel 130 has an area which is used for recognizing the handwriting, which is called an input screen 132. A user can input symbols at the input screen 132, to give an operating instruction or start software. The methods to input the symbols are not limited to input by the touch panel 130. FIG. 1C is a diagram showing another mobile communication device structure according to the invention. A touch panel will easily get scratched or even eventually get damaged with the increase of the numbers of use. Therefore, in some embodiments, the touch panel 130 described above also can be replaced by a monitor 136 and a handwriting panel 134. The handwriting panel can be for example embedded to or external connected to the mobile communication device, to receive the input of the symbols or for writing a message, so the operating interface (user's interface) of the mobile communication device can instead be displayed on the monitor 136 (for example, a LCD monitor). Then because the monitor is not for handwriting anymore, it is more unlikely to be scratched or damaged. The following paragraph will describe the operating method of the mobile communication device of the preferred illustrative embodiment according to the invention.

Figure 2:
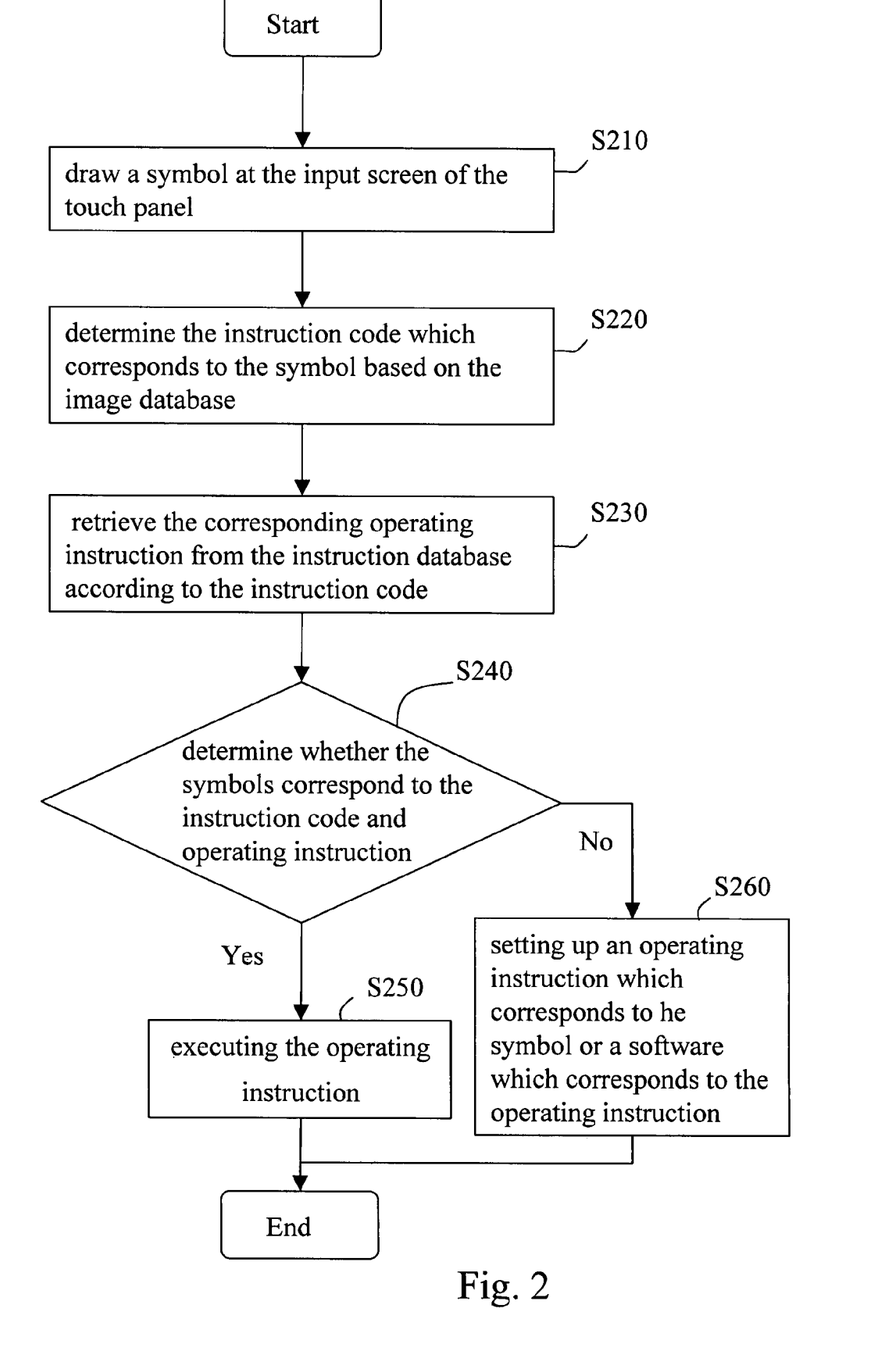
FIG. 2 is a flowchart of the operating method of the mobile communication device.

FIG. 2 is a flowchart of the operating method of the mobile communication device according to the invention. The method includes the following steps. First, draw a symbol at the input screen of the touch panel (step S210), where the symbol can be an English word, a Chinese word, or a special figure. Then, determine the instruction code which corresponds to the symbol based on the image database (step S220), where the micro processor fetches the symbol and compare with the symbol and the data in the image database. Each image data has its own instruction code, for example, an image data A which corresponds to a drawn symbol "M", can has its corresponding instruction code 1000, so when the micro processor has matched the symbol with the image data A in the image database, the image database will report the instruction code 1000 to the micro processor. After that, the micro processor will retrieve the corresponding operating instruction from the instruction database according to the instruction code (step S230), where the operating instructions may include starting the software, stopping the software or executing a specific function of the software. Finally, determine whether the symbols correspond to the instruction code and operating instruction (step S240), where if the answer is yes, executing the operating instruction (step S250) and if the answer is not, setting up an operating instruction which corresponds to he symbol or a software which corresponds to the operating instruction. The image database only stores images and instruction codes, and only instruction codes will be retrieved after matching the symbols. The instruction code can be an English word (a word or a letter), a Chinese word, a Latin word, or numbers. The micro processor can then retrieve the corresponding operating instruction from the instruction database according to the instruction code. That is, the step of finding out the corresponding image data in the image database and the step of finding out the operating instruction wanted to be retrieved in the instruction database are both necessary in instruction to complete the whole determination step to execute the operating instruction. If there is no operating instruction that corresponds to the inputted symbol, the mobile communication device can allow the user to set up an operating instruction which corresponds to the symbol or software which the user wants to control through an operating interface.

The step of setting up an operating instruction which corresponds to the symbol or software which corresponds to the operating instruction includes the following steps. First, select executing setting up with the inputted symbol which fetch by the micro processor, or reentering a symbol. Then, select software which the symbol wants to be corresponded to from the software list. After that, produce an operating instruction list based on the selected software. Finally, select an operating instruction which the symbol wants to be corresponded to from the operating instruction list. In instruction to further illustrate the invention, the description in the following paragraph will be incorporated with the operating interface.

Figure 3A:
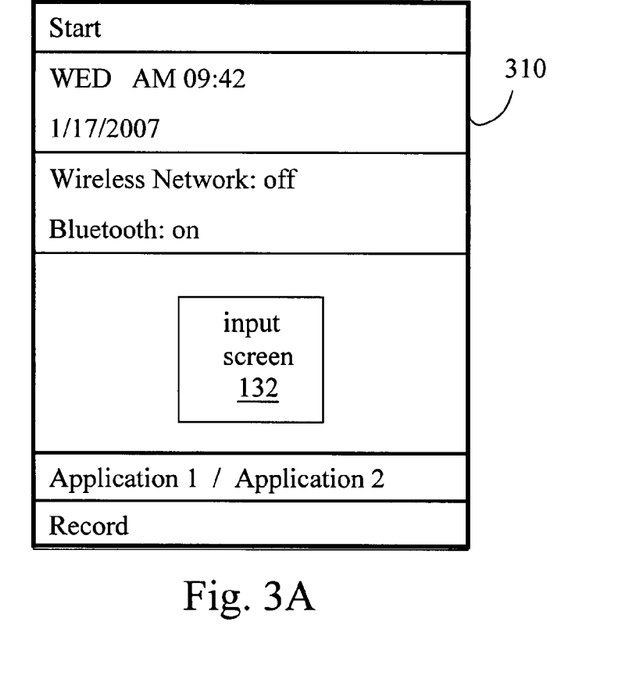
FIGS. 3A to 3D are diagrams showing the user's interface of the mobile communication device according to the invention.
Figure 3B:
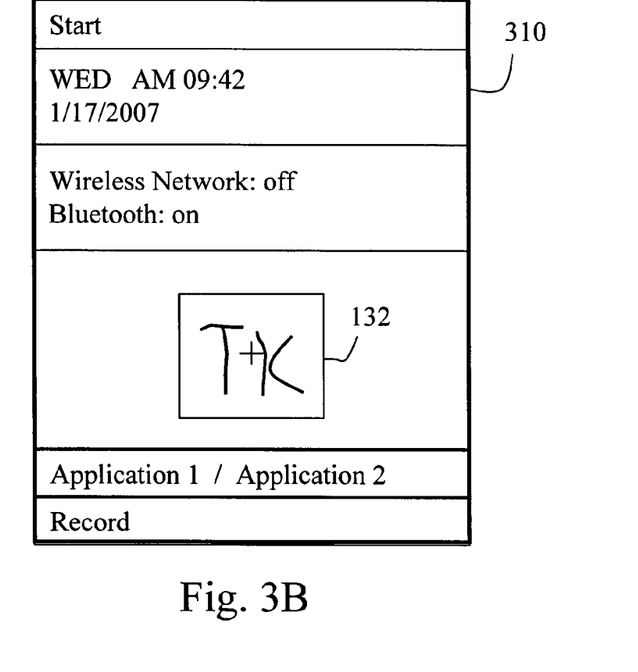
Figure 3C:
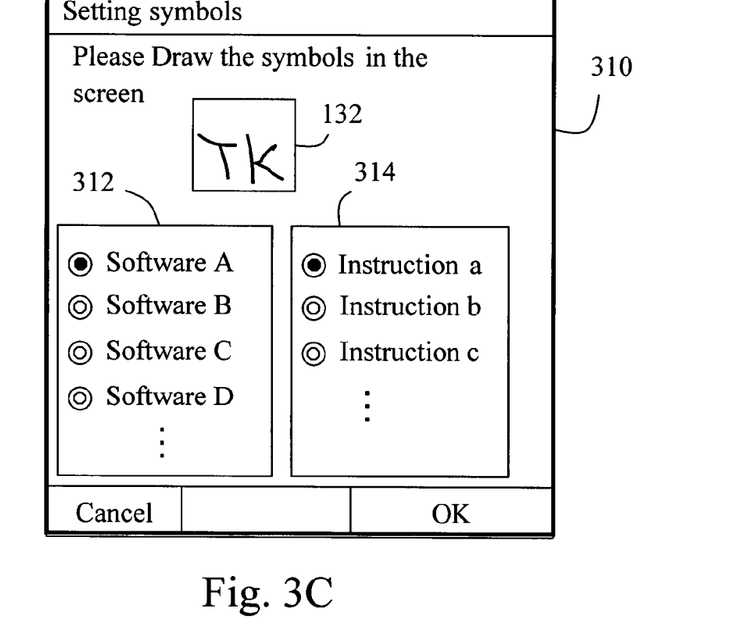
Figure 3D:
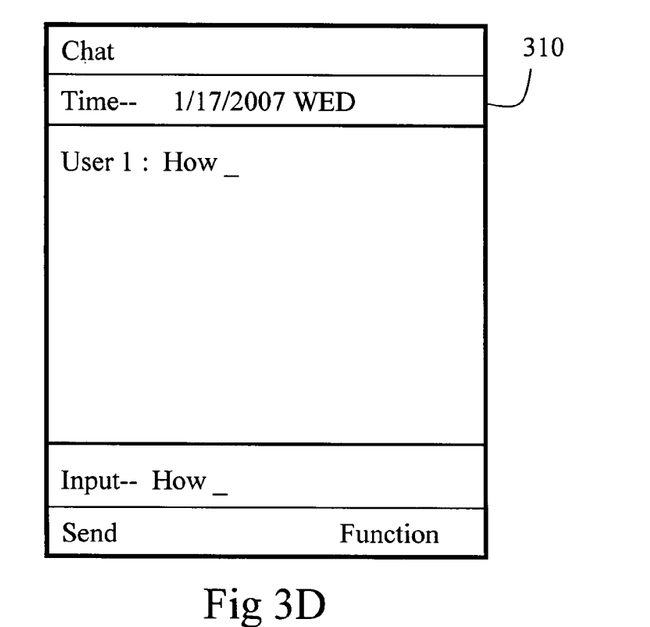

FIGS. 3A to 3D are diagrams showing the user's interface of the mobile communication device according to the invention. In FIG. 3A, the lower part of the user's interface 310 of the mobile communication device includes an input screen 132 for inputting symbols. Then, in FIG. 3B, a user can draw a symbol at the input screen 132 by handwriting. In this embodiment, English letters "TK" was inputted. At this time, the micro processor will read the "TK" as one symbol, and go to the image database to find out whether there is a corresponding image data. If there is one, then the micro processor will retrieve the instruction code which corresponds to the symbol and search for a corresponding operating instruction from the instruction database according to the instruction code. When there is no operating instructions or software which correspond to the inputted symbol in the image database or instruction database, a user's interface like the one shown in FIG. 3C will show up, and then user can select either to set up with the ordinary inputted symbol or to re-draw a symbol at the input window 132. A software list will show up on the left side of the user's interface 310 for users to set up the software that the symbol wants to be corresponds to. After selecting the software, the mobile communication device will produce an operating instruction list that the user can select the operating instruction which the symbol wants to execute. After pressing the finish button, the relationship between the symbol and the operating instruction or the relationship between the software and the instruction will be stored in the memory. After setting up the relationship between the symbol and the operating instruction or the relationship between the software and the instruction, the user can input the preset symbol to trigger the operating instruction (or the software) which corresponds to it. For example, if the user has set up inputting "TK" to trigger a chat room function before, then when the user handwrites "TK" at the input screen, the chat room function will be activated (as shown in FIG. 3D).

The mobile communication device of the invention may also be able to make a call or send a message to the contact which corresponds to the symbol just by handwriting the symbol. For instance, if one name of contact is Steven, after setting up, this device allows you to just handwrite "S" at the input screen 132 to start making a call to Steven.

According to the FIG. 1A, after the user handwrites a symbol at the touch panel, the micro processor 110 will analyze the symbol based on the image database 122, and then look for the corresponding contact and the communication action to be executed based on the analysis result. If the inputted symbol doesn't have preset corresponding contact and communication action, a user's interface can be used to set up the relationship between the symbol and the contact, and the relationship between the symbol and the communication action. Take the communication action as sending a message or making a call for an example, if the inputted symbol has its corresponding contact and communication action in the instruction database 124, then the device will send a message to the contact by the message module 140 or make a call to the contact by the communication module 150.

Figure 4:
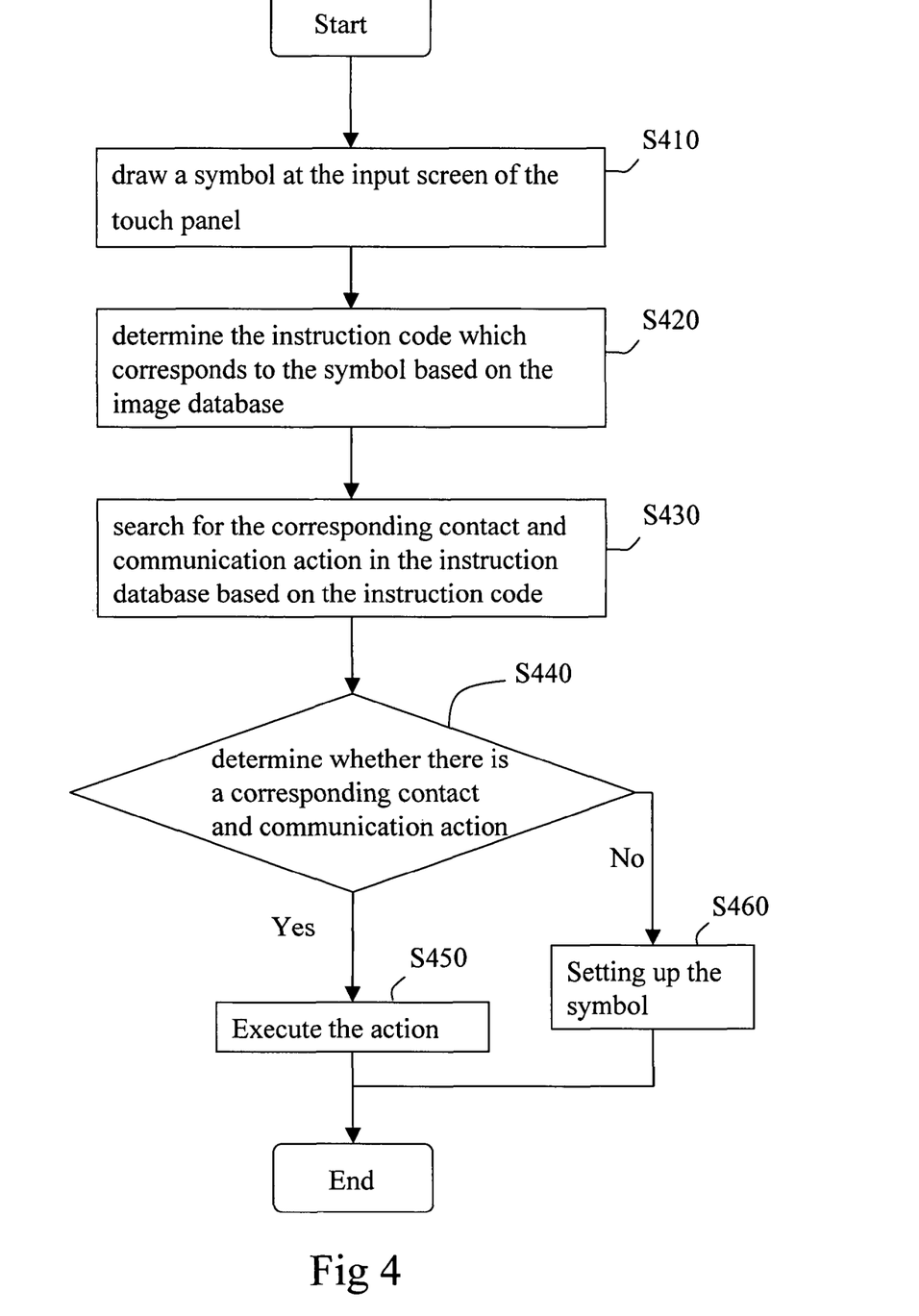
FIG. 4 is another flow chart of the operating method of the mobile communication device.

FIG. 4 is another flowchart of the operating method of the mobile communication device. The operating method includes the following steps. First, draw a symbol at the input screen of the touch panel (step S410). Then, determine the instruction code which corresponds to the symbol based on the image database (step S420). After that, search for the corresponding contact and communication action in the instruction database based on the instruction code (step S430). Finally, determine whether there is a corresponding contact and communication action (step S440), where if the answer is yes, execute the corresponding communication action (step S450), and if the answer is no, then may select setting up a contact and a communication action which corresponds to the inputted symbol (step S460). The step S460 can further include the following steps: A. open the contact list; B. select a contact from the contact list; C. select setting up with the inputted symbol or reentering a symbol; and D. select the communication action to be making a call or sending a message.

Figure 5A:
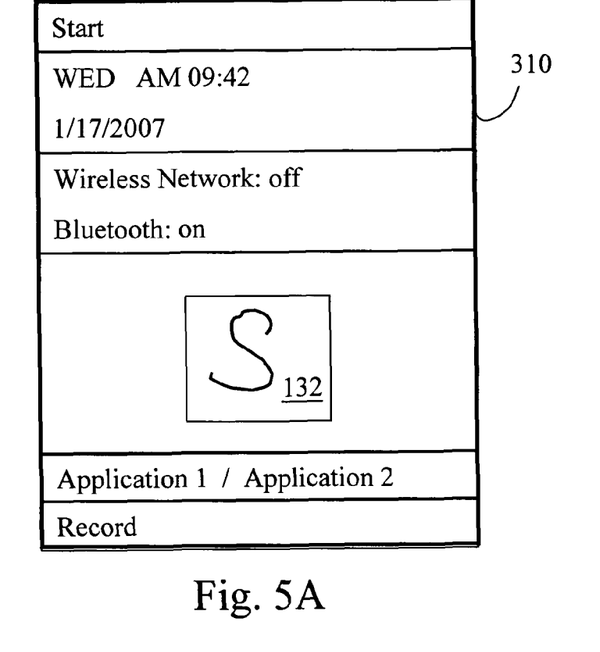
FIGS. 5A to 5F are diagrams showing the user's interface of the mobile communication device according to the invention.
Figure 5B:
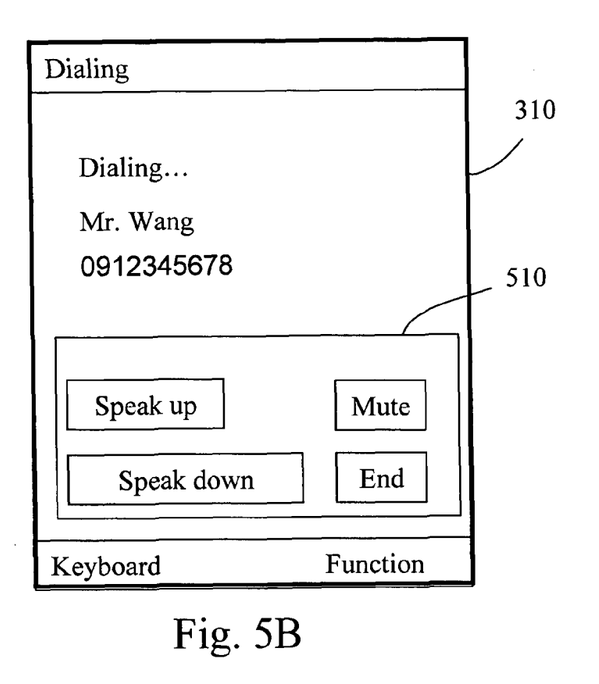
Figure 5C:
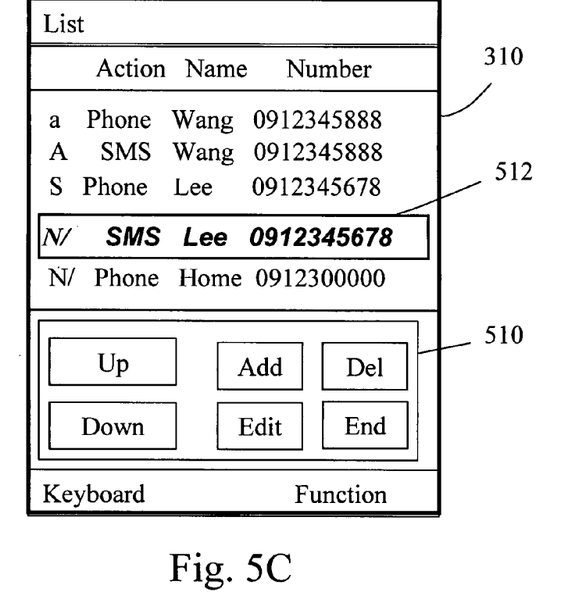
Figure 5D:
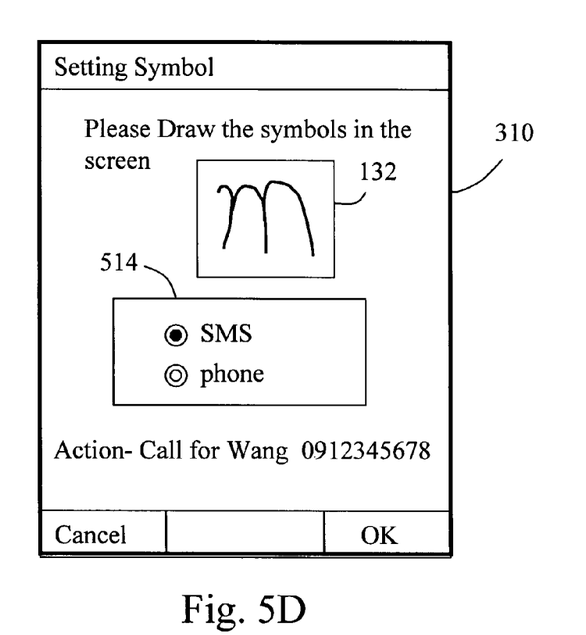
Figure 5E:
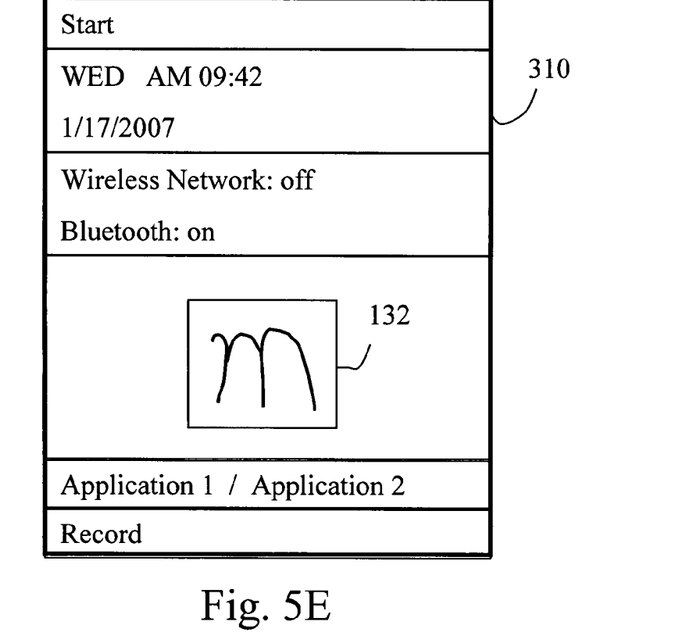
Figure 5F:
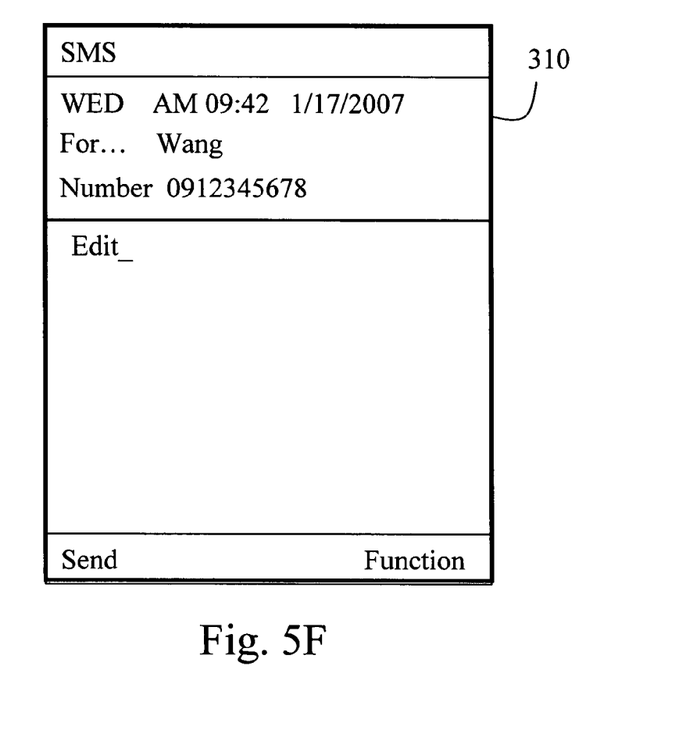

Now, the operating interface will be incorporated in order to describe the above preferred illustrative embodiment from another aspect. FIGS. 5A to 5F are diagrams showing the user's interface of the mobile communication device according to the invention. According to the figures, first in FIG. 5A, a letter "S" was handwriting inputted at the input screen of the user's interface 310. Because the contact and the communication action which correspond to the "S" are already stored in the instruction database, therefore as shown in FIG. 5B, after the handwriting, the mobile communication device will directly make a call to the contact. During the call, the user can control the communication through the function list, such as increasing or decreasing the volume, speaker, mute or cancel. If there is no preset contact and communication which correspond to the inputted symbol, then the user may setup a relationship between the symbol and a contact and a relationship between the symbol and a communication action by a setting up interface (or a user's interface). For example, in an illustrative embodiment, if the inputted symbol is letter "X", and after it is inputted, the device found out there is no corresponding contact and communication action, the user may choose to open up the contact list to execute the code setting up action. In FIG. 5C, when the contact list is opened up, the user may use the function list 510 to select the contact information 512 from the contact list and edit it or skim other contacts' information. When one corresponding contact is selected, another user's interface will be opened up for setting up the code. In FIG. 5D, the user can select using the inputted symbol to execute the communication action setting or reentering a new one at the input screen 132. The communication action may include making a call or sending a message from the function list. In this embodiment, the user chooses reentering a new symbol "M" at the input screen and select sending a message as a communication action. In FIG. 5E, after finish the setting, and when the user goes back to the started user's manual 310 and handwrites a symbol "M" at the input screen, as shown in FIG. 5F, a corresponding contact can be found by searching the image database and the instruction database and a message sending action will be executed.

In summary, because the invention allows a user to trigger a communication or an operating instruction by directly handwriting a symbol and then searching for contact and communication action which correspond to the symbol from an image database and an instruction database, the invention has the following advantages. 1. Handwriting to input a symbol at a specific input screen has the same effect as using hot keys therefore may lower the operating complexity. 2. Handwriting to input a symbol at a specific input screen can prevent unnecessary operating error. 3. The amounts of the symbols to be stored can be expanded with the increase of the memory.

While the illustrative embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A mobile communication device which allows handwriting to input at least one symbol to execute a preset corresponding operating instruction, comprising:
   a touch panel for handwriting to input the symbols and for displaying an operating interface of the mobile communication device;
   a memory, including:
      an image database for storing the symbols;
      an instruction database for storing the operating instructions which correspond to the symbols; and
      at least one software;
   a micro processor for analyzing the symbols based on the image database, retrieving the corresponding operating instruction from the instruction database according to the analysis result, executing the corresponding software based on the operating instruction and when the analysis of the symbols or retrieving the symbols and corresponding operating instruction fails, letting a user set up the operating instruction and the software which correspond to the symbols by the operating interface; wherein the micro processor selects setting up with the symbol or reentering the symbol, selects the corresponding software from a software list, produces an operating instruction list based on the selected software, and selects the operating instruction to correspond to the symbol, for letting the user set up the operating instruction and the software which correspond to the symbols by the operating interface;
   a communication module, connecting to the micro processor for executing a voice communication; and
   a message module, connecting to the micro processor for sending a message.

2. The mobile communication device of claim 1, wherein the touch panel includes an input screen for handwriting to input the symbols.

3. The mobile communication device of claim 1, further including:
   a keyboard for inputting texts or making a call; and
   an antenna module for executing the communication.

4. The mobile communication device of claim 1, further including:
   a monitor for displaying the operating interface; and
   a handwriting board for handwriting to input the symbols and inputting texts.

5. The mobile communication device of claim 1, wherein the memory is an external memory or a embedded memory.

6. An operating method of mobile communication device, for handwriting to input at least one symbol to execute an corresponding operating instruction, the method comprising:
   receiving the symbols, which are inputted at a input screen of a touch panel;
   determining an instruction code which corresponds to the symbol based on an image database;
   retrieving a corresponding operating instruction from the instruction database based on the instruction code; and
   determining whether the symbol corresponds to the instruction code and the operating instruction, wherein when the symbol corresponds to the instruction code and the operating instruction, executing the operating instruction otherwise letting a user set up the operating instruction which corresponds to the symbol or the software which corresponds to the operating instruction by an operating interface of the mobile communication device by the following steps:
      selecting setting up with the symbol or reentering the symbol;
      selecting the corresponding software from a software list;
      producing an operating instruction list based on the selected software; and
      selecting the operating instruction to correspond to the symbol.

7. The operating method of claim 6, wherein the instruction code is a English word, a Chinese word, a Latin word or a number.

8. The operating method of claim 6, wherein the operating instruction includes starting the software, stopping the software, or executing a specific function of the software.

9. A mobile communication device for handwriting to input at least one symbol to make a call or send a message to a contact which corresponds to the symbol, comprising:
   a touch panel for handwriting to input the symbols and for displaying an operating interface of the mobile communication device;
   a memory, including:
      an image database for storing the symbols; and
      an instruction database for storing the contact which corresponds to the symbol and a communication action;
   a micro processor for analyzing the symbols based on the image database, retrieving the corresponding contact from the instruction database and executing the corresponding communication action according to the analysis result, wherein when the analysis of the contact and the communication action to be executed to be corresponded to the symbol fails, letting a user set up the contact and the communication action which correspond to the symbol by the operating interface; wherein the micro processor selects setting up with the symbol or reentering the symbol, selects the corresponding software from a software list, produces an operating instruction list based on the selected software, and selects the operating instruction to correspond to the symbol, for letting the user set up the operating instruction and the software which correspond to the symbols by the operating interface;
   a message module for sending a message to the contact; and
   a communication module for making a call to the contact.

10. The mobile communication device of claim 9, wherein the touch panel includes an input screen for handwriting to input the symbols.

11. The mobile communication device of claim 9, further including:
   a keyboard for inputting texts or making a call; and an antenna module for executing the communication.

12. The mobile communication device of claim 9, further including:
   a monitor for displaying the operating interface; and
   a handwriting board for handwriting to input the symbols and inputting texts.

13. The mobile communication device of claim 9, wherein the memory is an external memory or a embedded memory.

14. The mobile communication device of claim 9, wherein the communication action includes making a call and sending a message.

15. An operating method of mobile communication device, for handwriting to input at least one symbol to make a call or send message to a contact which corresponds to the symbol, the method comprising:
   inputting the symbol at a input screen of a touch panel;
   determining an instruction code which corresponds to the symbol based on an image database;
   searching for the corresponding contact and a corresponding communication action based on the instruction code; and
   determining whether the corresponding contact and the communication action can be found, wherein when the corresponding contact and the communication action are found, execute the corresponding communication action otherwise select letting a user set up the contact and the communication action which correspond to the symbol by an operating interface of the mobile communication device by the following steps:
   opening the contact list;
   selecting a contact from the contact list;
   selecting setting up with the inputted symbol or reentering a symbol; and
   selecting the communication action to be making a call or sending a message.

16. A mobile communication device which allows handwriting to input at least one symbol to execute a preset corresponding operating instruction, comprising:
   a touch panel for handwriting to input the symbols and for displaying an operating interface of the mobile communication device;
   a memory, including:
   an image database for storing the symbols;
   an instruction database for storing the operating instructions which correspond to the symbols; and
   at least one software;
   a micro processor for analyzing the symbols based on the image database, retrieving the corresponding operating instruction from the instruction database according to the analysis result, executing the corresponding software based on the operating instruction; and when the analysis of the symbols or retrieving the symbols and corresponding operating instruction fails, letting a user set up the operating instruction and the software which correspond to the symbols by the operating interface, and storing the relationship between the symbol and the operating instruction or the relationship between the software and the operating instruction into the memory;
   a communication module, connecting to the micro processor for executing a voice communication; and
   a message module, connecting to the micro processor for sending a message.

17. An operating method of mobile communication device, for handwriting to input at least one symbol to execute an corresponding operating instruction, the method comprising:
   receiving the symbols, which are inputted at a input screen of a touch panel;
   determining an instruction code which corresponds to the symbol based on an image database;
   retrieving a corresponding operating instruction from the instruction database based on the instruction code; and
   determining whether the symbol corresponds to the instruction code and the operating instruction, wherein when the symbol corresponds to the instruction code and the operating instruction, executing the operating instruction; otherwise letting a user set up the operating instruction which corresponds to the symbol or the software which corresponds to the operating instruction by an operating interface of the mobile communication device, and storing the relationship between the symbol and the operating instruction or the relationship between the software and the operating instruction into the symbol based or the image database.

18. A mobile communication device for handwriting to input at least one symbol to make a call or send a message to a contact which corresponds to the symbol, comprising:
   a touch panel for handwriting to input the symbols and for displaying an operating interface of the mobile communication device;
   a memory, including:
   an image database for storing the symbols; and
   an instruction database for storing the contact which corresponds to the symbol and a communication action;
   a micro processor for analyzing the symbols based on the image database, retrieving the corresponding contact from the instruction database and executing the corresponding communication action according to the analysis result, wherein when the analysis of the contact and the communication action to be executed to be corresponded to the symbol fails, letting a user set up the contact and the communication action which correspond to the symbol by the operating interface, and storing the relationship between the symbol and the contact, and the relationship between the symbol and the communication action into the memory;
   a message module for sending a message to the contact; and
   a communication module for making a call to the contact.

19. An operating method of mobile communication device, for handwriting to input at least one symbol to make a call or send message to a contact which corresponds to the symbol, the method comprising:
   inputting the symbol at a input screen of a touch panel;
   determining an instruction code which corresponds to the symbol based on an image database;
   searching for the corresponding contact and a corresponding communication action based on the instruction code; and
   determining whether the corresponding contact and the communication action can be found, wherein when the corresponding contact and the communication action are found, execute the corresponding communication action; otherwise select letting a user set up the contact and the communication action which correspond to the symbol by an operating interface of the mobile communication device, and storing the relationship between the symbol and the contact, and the relationship between the symbol and the communication action into the memory.

* * * * *